(12) United States Patent
Tischler et al.

(10) Patent No.: US 10,967,444 B2
(45) Date of Patent: *Apr. 6, 2021

(54) SHEAR BLADE FOR A CUTTING TOOL

(71) Applicant: LUKAS Hydraulik GmbH, Erlangen (DE)

(72) Inventors: Herbert Tischler, Erlangen (DE); Tammy Horne, Gastonia, NC (US); Carsten Sauerbier, Lauf (DE)

(73) Assignee: LUKAS Hydraulik GmbH, Erlangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/345,000

(22) PCT Filed: Oct. 28, 2016

(86) PCT No.: PCT/EP2016/076067
§ 371 (c)(1),
(2) Date: Apr. 25, 2019

(87) PCT Pub. No.: WO2018/077419
PCT Pub. Date: May 3, 2018

(65) Prior Publication Data
US 2019/0270145 A1    Sep. 5, 2019

(51) Int. Cl.
*B23D 35/00*    (2006.01)
*B23D 29/00*    (2006.01)
(Continued)

(52) U.S. Cl.
CPC ............ *B23D 35/001* (2013.01); *A62B 3/005* (2013.01); *B23D 17/00* (2013.01); *B23D 29/005* (2013.01); *B23D 35/002* (2013.01); *B23D 29/00* (2013.01)

(58) Field of Classification Search
CPC .. B23D 35/001; B23D 35/002; B23D 29/005; B23D 31/00; B23D 31/008; B23D 17/00; B23D 29/00; A62B 3/005
See application file for complete search history.

(56) References Cited

U.S. PATENT DOCUMENTS 3,929,044 A    12/1975    Beauchet
4,043,367 A *  8/1977    Knuth .................... B23D 49/14
                                              30/501
(Continued)

FOREIGN PATENT DOCUMENTS

AT    511 457 A4    12/2012
DE    624096    *    1/1936
(Continued)

OTHER PUBLICATIONS

International Search Report and Written Opinion of the International Searching Authority for corresponding International Patent Application No. PCT/EP2016/076067 dated Jun. 30, 2017, 14 pages.
(Continued)

*Primary Examiner* — Hwei-Siu C Payer
(74) *Attorney, Agent, or Firm* — Merchant & Gould P.C.

(57) ABSTRACT

A shear blade (2) is for a portable hydraulic cutting device, such as a rescue device having a blade body (9). The blade body (9) has an assembly region (18) and a cutting region (15), a cutting edge (16) in the cutting region (15), a contact surface (13), located on one side of the cutting edge (16), for an additional shear blade. An outer surface (14), located on the other side of the cutting edge (16), is provided to act on the object to be cut. The cutting region (15) has a recess (22) for receiving a cutting insert (21). The recess (22) is con-
(Continued)

Figure 1:
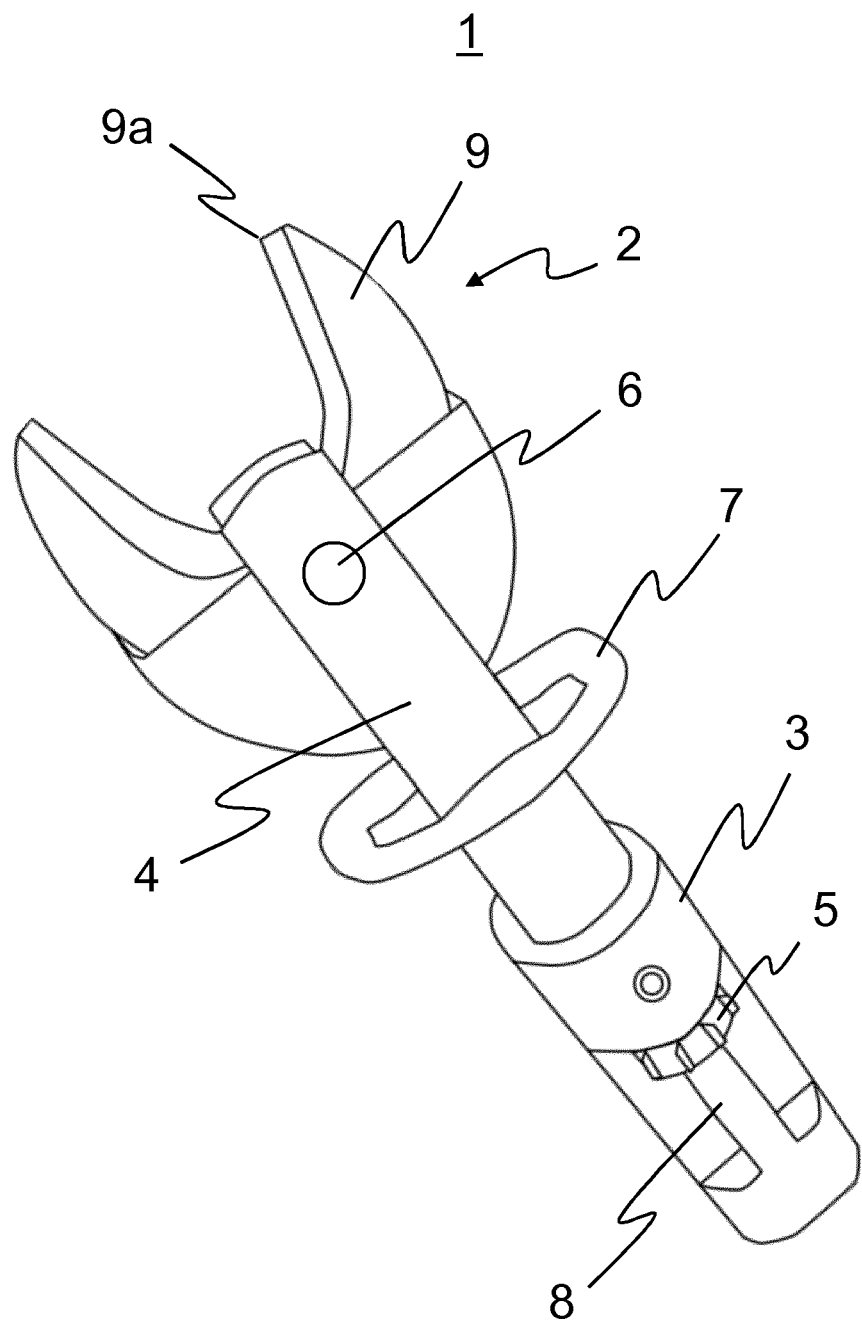

figured such that the cutting insert (21) is insertable into the recess (22) at an acute angle δ to the contact surface (13) of the shear blade (2).

15 Claims, 7 Drawing Sheets

(51) Int. Cl.
    *A62B 3/00*     (2006.01)
    *B23D 17/00*     (2006.01)

(56) References Cited

U.S. PATENT DOCUMENTS

| | | | | |
|---|---|---|---|---|
| 4,417,510 | A | 11/1983 | Sharp | |
| 5,243,761 | A * | 9/1993 | Sullivan | A62B 3/005 173/169 |
| 5,873,168 | A * | 2/1999 | Johnson | B23D 17/00 241/101.73 |
| 6,244,568 | B1 * | 6/2001 | Patton | A62B 3/005 254/93 H |
| 7,255,295 | B2 * | 8/2007 | Ramun | A62B 3/005 241/266 |
| 7,568,372 | B1 * | 8/2009 | Patton | A62B 3/005 72/453.15 |
| 9,517,364 | B2 * | 12/2016 | Herwig | F16G 15/06 |
| 2014/0123824 | A1 * | 5/2014 | Strohmeier | B23D 35/002 83/694 |
| 2014/0319257 | A1 | 10/2014 | Clemons | |
| 2014/0331843 | A1 | 11/2014 | Hall | |
| 2015/0314460 | A1 * | 11/2015 | Wakabayashi | B26B 13/28 30/254 |
| 2018/0021603 | A1 * | 1/2018 | Horne | A62B 3/005 254/93 R |
| 2019/0255631 | A1 * | 8/2019 | Tischler | B23D 17/00 |
| 2019/0270145 | A1 * | 9/2019 | Tischler | B23D 29/005 |

FOREIGN PATENT DOCUMENTS

| | | |
|---|---|---|
| DE | 19 21 924 A1 | 11/1970 |
| DE | 9207522 * | 8/1992 |
| DE | 102 43 308 A1 | 4/2004 |
| DE | 10 2009 059 940 A1 | 6/2011 |
| DE | 102009059940 * | 6/2011 |
| DE | 10 2009 059 940 B4 | 9/2016 |
| EP | 0 259 742 A1 | 3/1988 |
| FR | 2 203 296 A6 | 5/1974 |
| GB | 191411477 A | 5/1915 |
| GB | 2254580 * | 10/1992 |
| SU | 529 019 A2 | 9/1976 |

OTHER PUBLICATIONS

European Office Action for corresponding European Patent Application No. 16788114.3 dated Feb. 3, 2020, 6 pages.

* cited by examiner

SHEAR BLADE FOR A CUTTING TOOL

This application is a National Stage Application of PCT/EP2016/076067, filed 28 Oct. 2016, and which application is incorporated herein by reference. To the extent appropriate, a claim of priority is made to the above-disclosed application.

TECHNOLOGICAL BACKGROUND

Hydraulic work tools for portable application are usually used for rescue missions by a fire brigade. A cutting tool, which is mainly used for cutting body parts and vehicle doors, is an example of a dedicated hydraulic device. Such cutting tools usually have a hydraulic control with a hydraulic pump, which can either be located directly in the cutting tool or in an emergency vehicle. The cutting tool additionally comprises two tool-halves that can be swiveled against each other, each of which has a shear blade for severing and/or cutting the material to be cut, e.g. the pillars of a car body. These shear blades have contact surfaces that are oriented toward each other and are usually straight, along which the shear blades are guided past each other when they are swiveled, i.e. opened and closed.

Increasingly greater demands regarding the cutting effectiveness, load bearing capacity, durability, weight and energy consumption are imposed on conventional cutting tools. It is the cutting effectiveness and the durability of the shear blades that are above all of primary importance in this. Aside from the choice of materials and thus the optimization of the material properties of the shear blade, it is above all the geometry of the shear blades that contributes to the improvement of the cutting effectiveness. The focus here lies on improving the cutting strength of the knives in such a way that it is possible to cut the same or stronger materials with less power.

STATE OF THE ART ACCORDING TO THE LITERATURE

The patent DE 10 2009 059 940 B4 describes a shear blade for cutting tools for cutting or splitting grooved structural steels. The shear blades are equipped with replaceable cutting inserts. In this case, the cutting inserts are stored in retaining pockets and are held by several clamping claws that are open on two sides. The clamping claws provide for a screw and a pin connection between the shear blade and the cutting insert by means of screwing and retaining pins. These clamping claws are attached to the cutting insert via an additional recess and thus require an additional form lock. The retaining pocket is here configured so that the cutting insert can be inserted into the recess parallel to the contact surface of the shear blades. Additional problems concerning the production time and the production costs arise because of the complicated construction of the cutting insert and the retaining pocket and the complex fastening with clamping claws and pins or screws. The functionality and the durability can furthermore be reduced in that the additional recesses on the cutting inserts produce an additional form closure with the clamping claws, which leads to stresses in the region of the fasteners, which can result in a fracture.

The publication AT 511 457 A4 describes a shear blade for a cutting tool, which comprises an inserted blade configured as a cutting wedge in a seat for the shear blade. The cutting wedge thus forms a cutting edge, while an open area, i.e. a contact surface, and a pressure surface, i.e. an outside surface, extending at an angle thereto are provided away from the cutting edge. The outside surface is designed to be continuously straight at a constant inclination. The blade is inserted parallel to the contact surface and constitutes a form-fit acting transverse to the open area, along a sloped form-fit surface located at the lower end of the seat. The inserted blade is furthermore attached to the base body by means of pin-shaped plug-in connections oriented transverse to the open area, arranged in aligned holes in the base body of the shear blades and in the inserted blade.

The pointed structure of the inserted blade increases the danger of fracture, since the two shear blades twist against each other with increasing pressure. The tip of the shear blade respectively acts as a fulcrum in doing so, i.e. this results in an increased risk of the cutting edge breaking out of the blade insert during the cutting process. The force and/or the pressure that is transferred to the blade insert by cutting the material to be cut is furthermore transferred either to the plug-in connection or in a wedge-like manner to the form-fit surface below the blade insert, which causes stress peaks and thus material fracture and therewith reduces the durability in both instances.

OBJECT OF THE PRESENT INVENTION

It is the object of the present invention to make available a generic shear blade with a new design, whose cutting effectiveness, stability and durability are improved.

Solution of the Object

According to the invention, the cutting tool has the recess shaped in such a manner that the blade can be inserted into the recess at a pointed angle $\delta$ to the contact surface of the shear blade. The blade can thus be inserted into the shear blade in a particularly simple manner. This action additionally allows for a beneficial force absorption by the inserted blade. Complicated fastening components, e.g. clamping jaws, are not needed. This improves the cutting efficiency and the durability of the shear blades.

At least one fastening component can be expediently provided for mounting the blades, whose orientation runs at a slanted angle $\varepsilon$, i.e. preferably at an acute angle $\varepsilon$, with respect to the contact surface, in the direction of the cutting edge. This has the advantage that the pressure, which is transferred to the inserted blade in cutting the material to be cut, is not transferred to the plug-in connection but rather to the form-fit surface below the inserted blade, whereby the risk of a material fracture is reduced and so that the durability is increased. The fastening component is preferably oriented perpendicular to the insertion direction of the cutting inserts.

An undercut can expediently be provided on at least one side, preferably on both sides, of the recess, which serves the purpose of inserting the cutting insert into the undercut in a guided manner and by way of a simple motion and of holding it in position. It is the replacement of the cutting inserts that is particularly simplified thereby.

A first surface section of the outside surface preferably extends from the cutting edge along an orthogonal O, which meets the contact surface in the region of the cutting edge, or at an acute angle $\alpha$ with respect to the orthogonal O. A second surface section is furthermore connected to the end of the first surface section and is oriented at an acute angle $\beta$ with respect to the orthogonal O starting from the first surface section. A third surface section, which is oriented at an acute angle $\gamma$ with respect to the orthogonal O follows the end of the second surface section. The angle $\alpha$ is additionally smaller than the angel β and the angle β is smaller than the angle γ. This has the advantage that a saving in pressure is achieved in the range of the cutting surface of the shear blade. This reduces the risk of the cutting edge breaking away and increases the stability as well as the durability of the shear blade.

As respectively seen from the cross section of the shear blade, the width of the first surface section can expediently be smaller than the width of the second surface section and the width of the second surface section can be smaller than the width of the third surface section. Because the first surface section has a very small width, it is possible to largely avoid the risk of the cutting edge slipping off and/or breaking, particularly in the case of high-strength material, but rather to make use of the wedge effect of the first surface section, which facilitates the cutting process, to sever the material to be cut.

The angle α can lie in a range of 0.5 to 5°, preferably in the range of 1 to 3°, particularly preferably in the range of 1.5 to 2.5°. The use of a very small angle α has the surprising effect that a saving in pressure is achieved, for example a saving in pressure of 3-8% with an angle of α=2° in comparison with an angle of α=0°.

The angle γ can expediently be greater than 45°, preferably greater than 48°, particularly preferably greater than 50°. The cutting effectiveness of the shear blades is thus additionally improved. It was surprisingly found that a particularly good cutting effectiveness can be achieved with an angle of γ=50°. The angle γ is at most 80°, preferably 70°, particularly preferably 60°.

Surface profiling is preferably provided in the neighborhood of the outside surface. By introducing this profiling, the cutting force exerted on the material to be cut is converted to a higher cutting pressure. The material to be cut is thereby exposed to a higher stress and this leads to an earlier failure.

Surface profiling can advantageously be provided only in the region of the second and/or the third surface section, preferably in the region of both surface sections. No surface profiling is to be provided in the region of the first surface section. The first surface section serves the purpose of pulling the material to be cut toward the cutting tool, so that most of the cutting pressure is applied to the material to be cut in the back part of the cutting region. The cutting effectiveness is thus particularly increased. On the contrary, surface profiling in the region of the first surface section impedes the pulling effect of the cutting tool.

The surface profiling can furthermore extend over the entire width of the respective surface section. This makes it possible for the force to be applied as uniformly as possible. Additional differences in tension are furthermore prevented through differently configured surface regions of the outside edge of the shear blade.

The surface profiling can preferably comprise individual grooves running next to each other, with the groves respectively having two opposite groove walls. Such surface profiling has been found to have a particularly noteworthy effect regarding a saving in pressure on the shear blade, which lies in the range of 3-8% compared with conventional shear blades.

The opposite walls of a groove are preferably configured so that one groove wall is steep, preferably curved, and the other groove wall is flat. The steep groove wall is respectively located on the side of the groove facing the knife point of the shear blade, so that the grooves exhibit a preferred orientation, in that the groove walls are oriented away from the knife point. This has the advantage that drawing in the material to be cut at the start of the cutting process as well as securely holding the material to be cut in the back of the region is facilitated during the cutting process.

The grooves are alternatively or additionally designed to be wavy or saw tooth-like, U-shaped, V-shaped or trapezoidal.

The cutting edge can expediently be curved concavely. This has the advantage that the material to be cut is pulled toward the cutting tool during the cutting process, at least at the beginning of the cutting process. The cutting effectiveness is particularly improved thereby.

The shear blade is preferably produced as a forged part or it is e.g. milled out of semi-finished material or a sheet of material.

The shear blade can be installed in the cutting tool in a simple way, in that the installation area has an opening for receiving a rotational axis component for simultaneously receiving a pair of shear blades, e.g. a central pin, and an opening for receiving an actuating element on the drive side, e.g. a securing pin, by means of which the shear blade is fastened to a lever arm of a tool arm.

The cutting region can expediently have a recess for installing a cutting insert. The recess is for practical reasons, at least partially located in the middle and back part of the cutting region, which serves the purpose of transmitting most of the cutting pressure to the material to be cut. The cutting region is preferably flush with the recess.

The present invention additionally claims a portable, in particular a hydraulic, cutting tool for portable application, preferably a rescue device, with a housing as well as a preferably manually operated hydraulic control valve, and two tool halves associated with a rotational axis, with at least one of the tool halves comprising a shear blade of this invention, with the cutting region having a recess for receiving a cutting insert, in which the recess is designed so that the cutting insert can be slid into the recess at an acute angle δ with respect to the contact surface of the shear blade.

DESCRIPTION OF THE INVENTION USING EXAMPLE EMBODIMENTS

Figure 2:
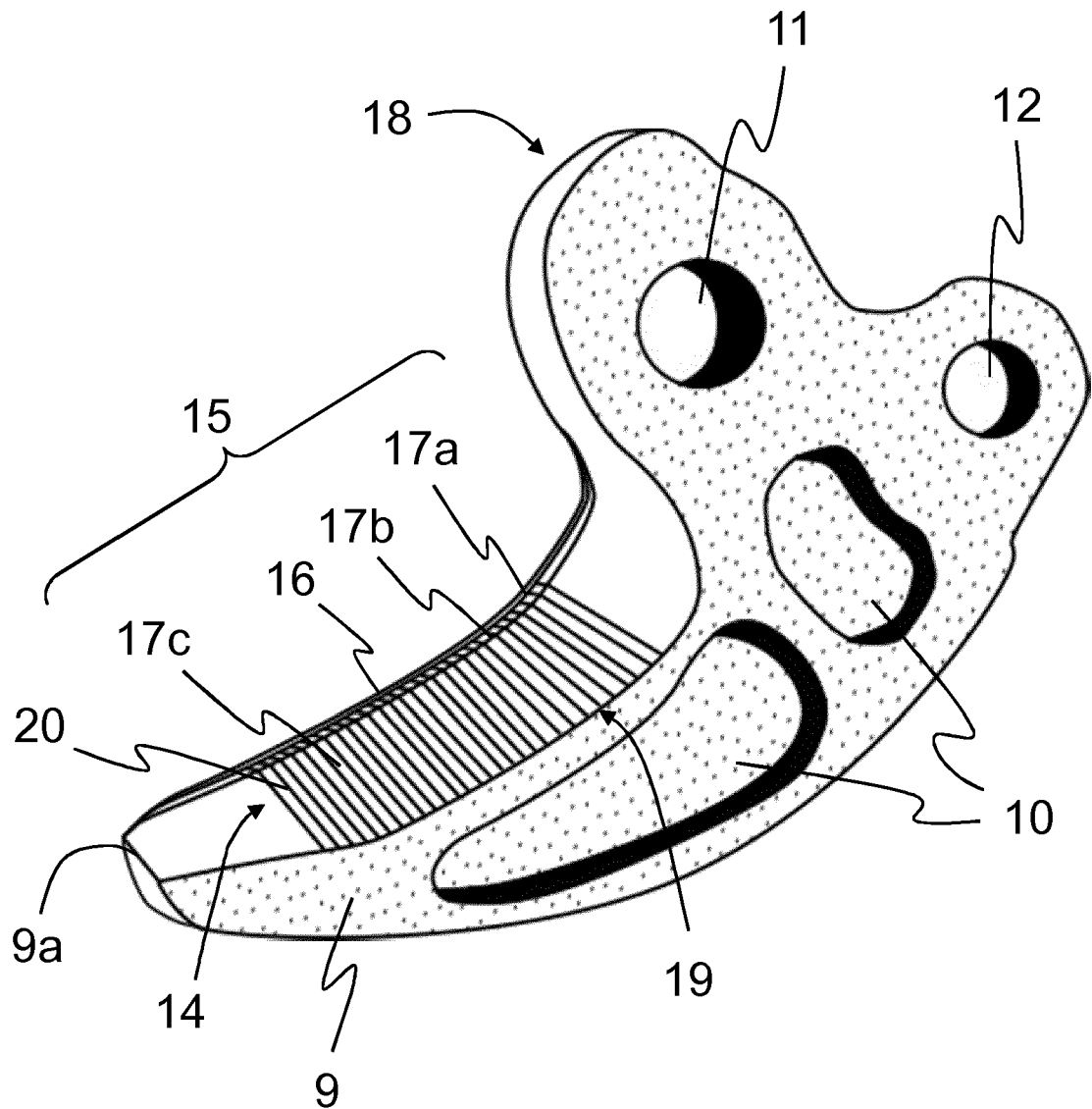
Figure 3:
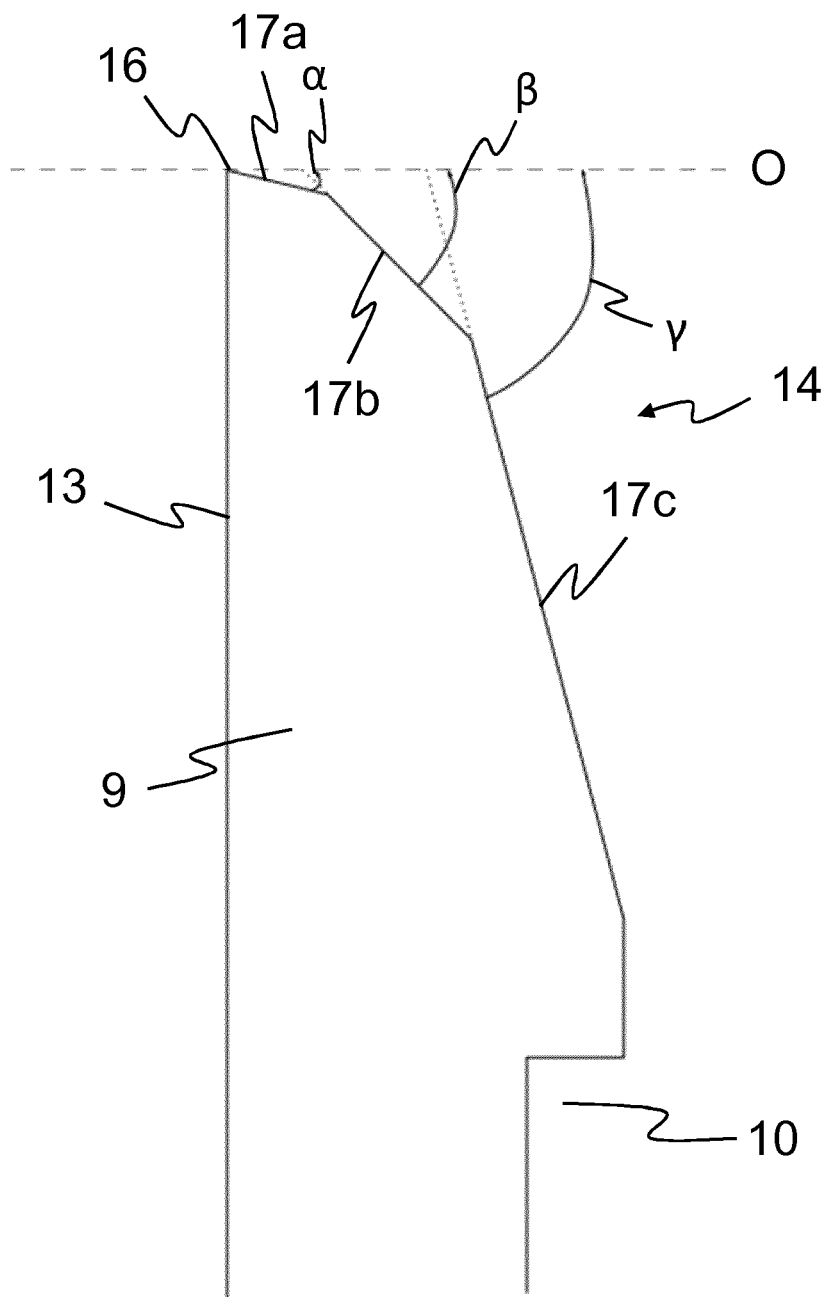
Figure 4A:
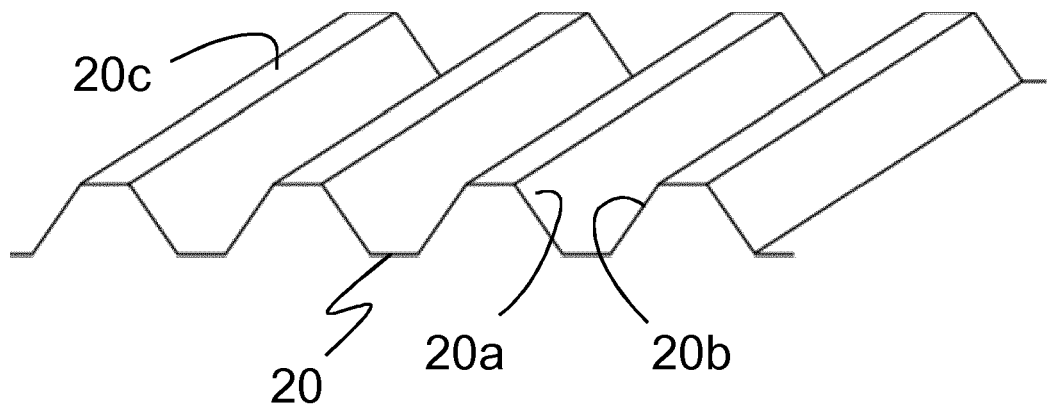
Figure 4B:
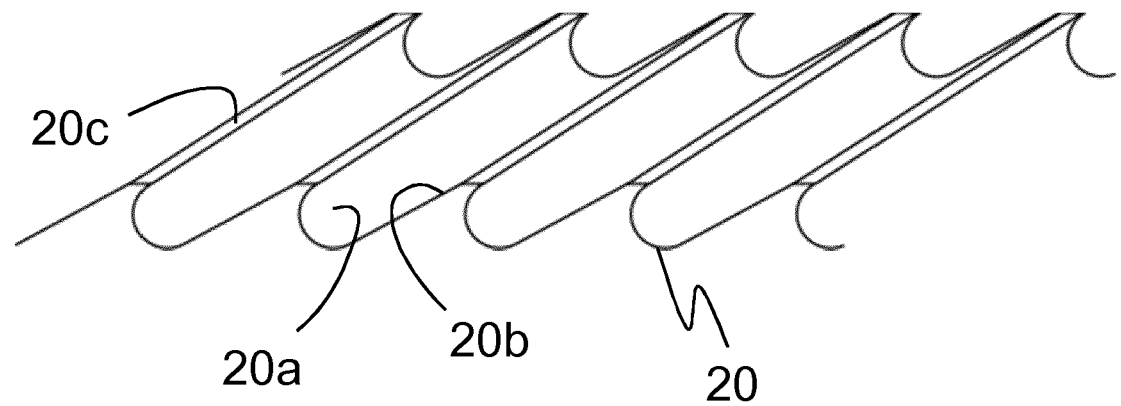
Figure 5:
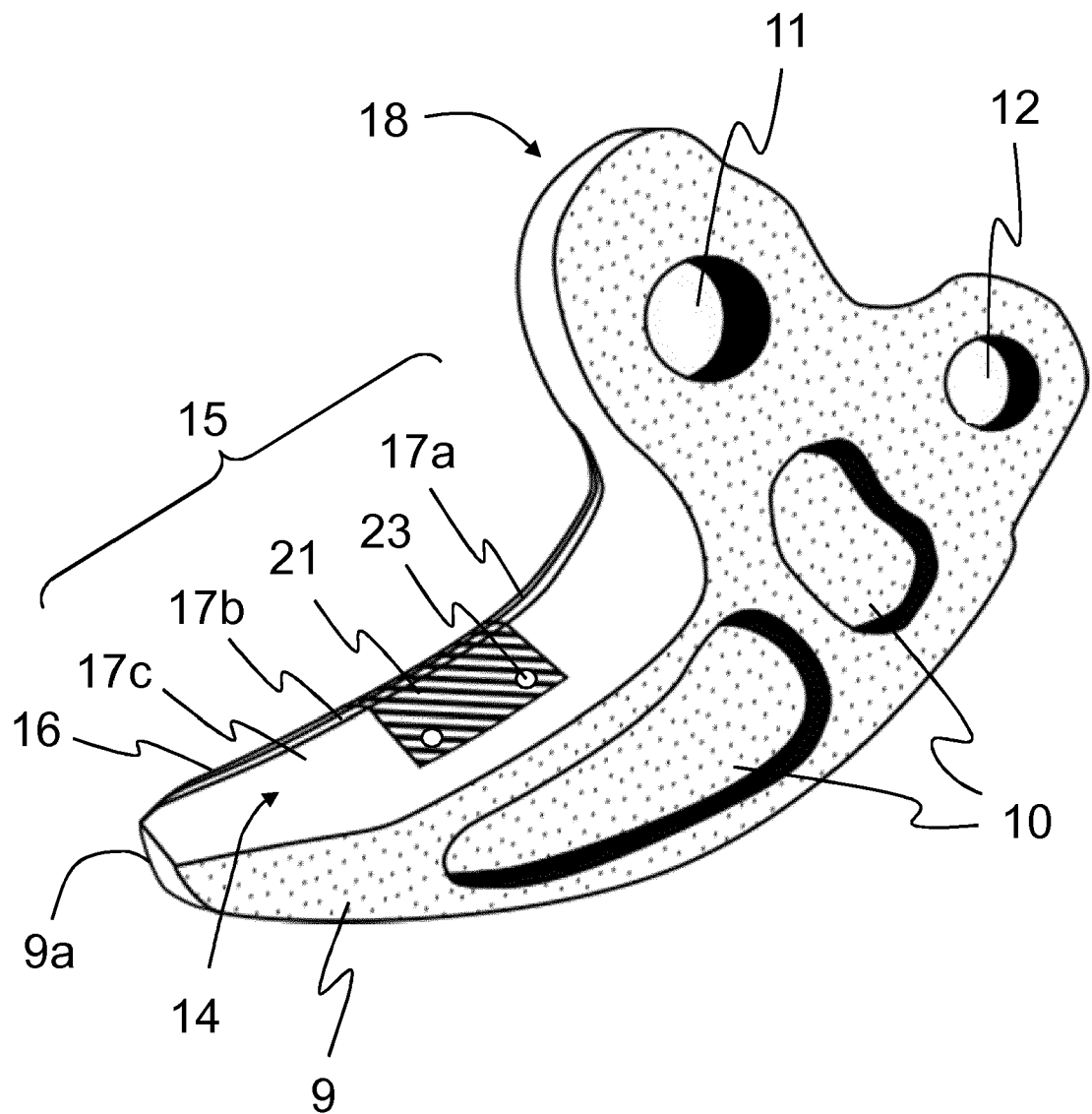
Figure 6A:
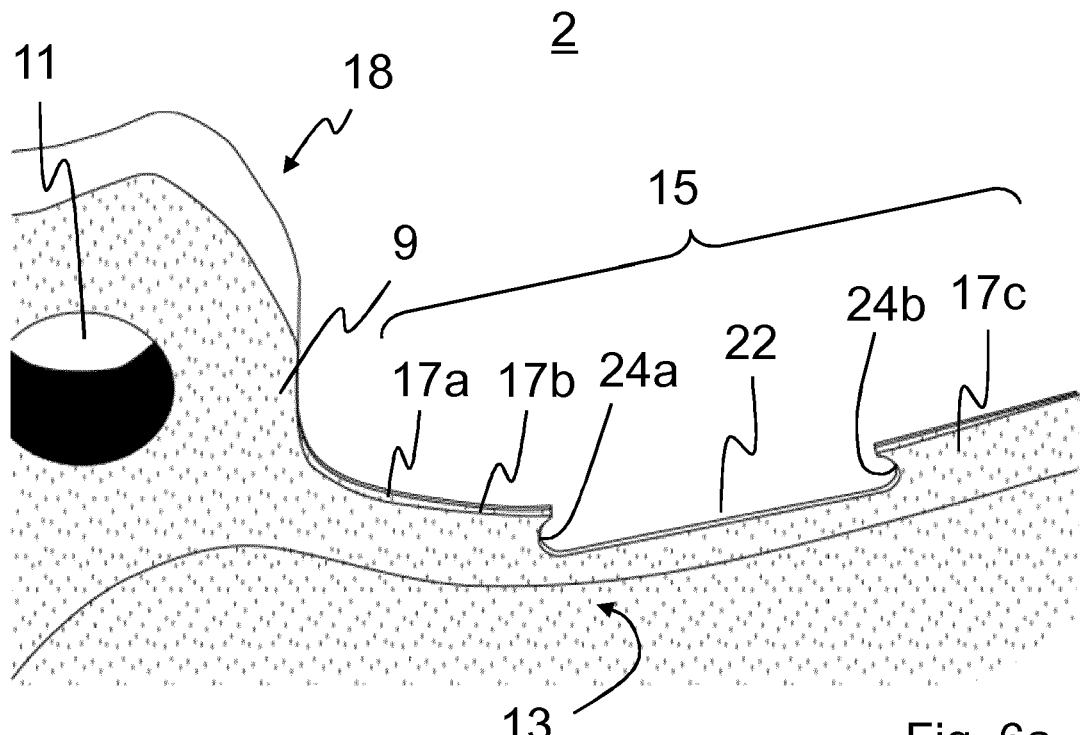
Figure 7:
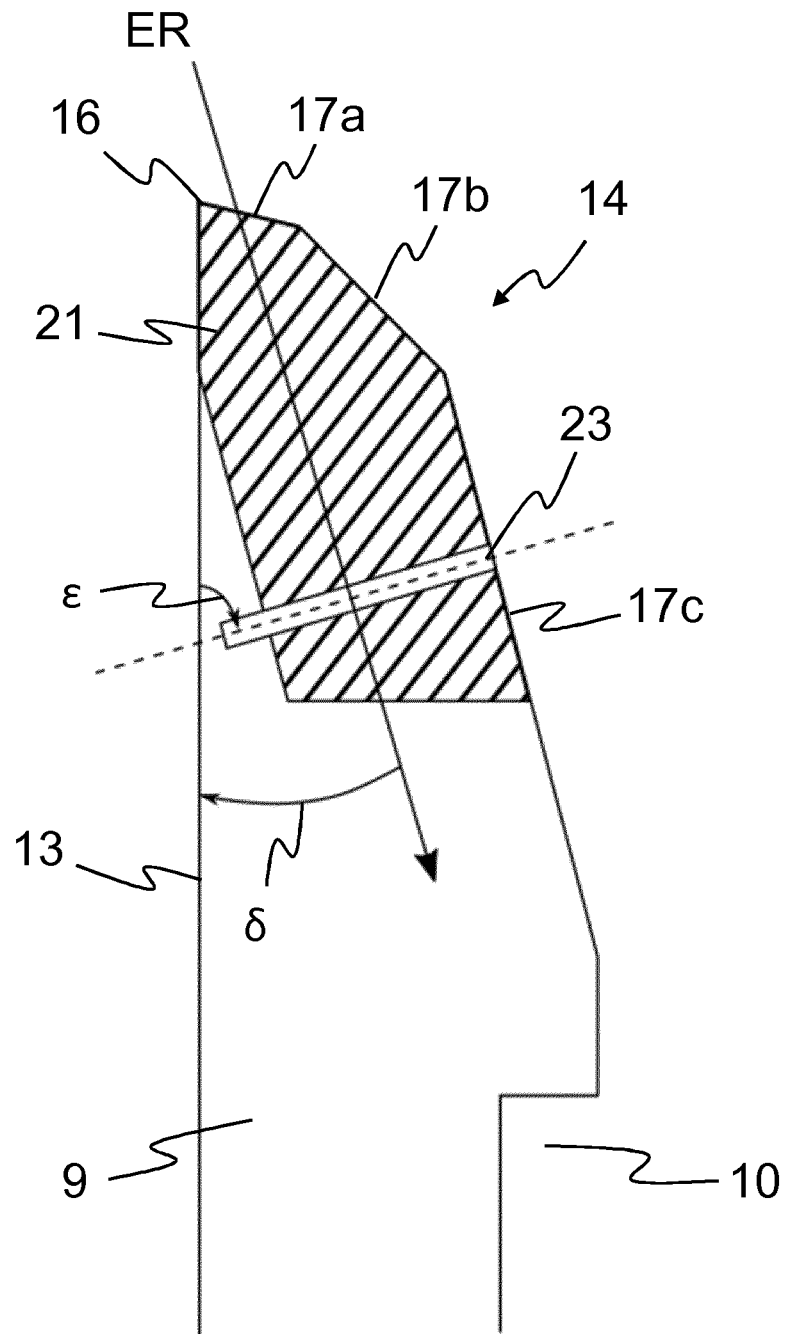

Suitable embodiments of the present invention are described below in greater detail using drawing, which show:

FIG. 1 a highly simplified perspective view of a cutting tool of this invention;

FIG. 2 a simplified perspective view of a shear blade of this invention;

FIG. 3 a simplified, merely schematic representation of a cross section through a shear blade of this invention;

FIG. 4a a simplified perspective representation of cross section through a part of a configuration of the surface profiling of this invention;

FIG. 4b a second simplified perspective representation of a cross section through a part of a second design of the surface profiling of this invention;

FIG. 5 a simplified perspective representation of shear blades with cutting inserts of this invention;

FIG. 6a a simplified partial perspective representation of the inventive shear blades of FIG. 5 with missing cutting inserts;

FIG. 6a a second partial simplified perspective representation of the inventive shear blades of FIG. 5 with installed cutting inserts, as well as FIG. 7 a simplified, merely schematic representation of the cross section through the inventive shear blade of FIG. 5.

The reference number 1 in FIG. 1 denotes a portable cutting tool for cutting and severing car body parts and vehicle doors. The cutting tool 1 has a housing 3 and a hydraulic cylinder 4, to which two tool halves are affixed, which respectively comprise a shear blade 2 with a blade body 9 and a blade tip 9a situated thereon. The shear blades 2 are positioned on a shared axis of rotation 6, so that the shear blades 2 can be pivoted against one another. A carrying strap 7 and a handle 8 for carrying the cutting tool 1 are furthermore positioned in the region of the housing 3 and/or the hydraulic cylinder 4. There is furthermore a manually operated control valve 5 near the handle 8, which valve allows the user to operate the cutting tool manually (cutting, opening as well as idle mode).

FIG. 5 shows the shear blade 2 of the cutting tool 1 of this invention in detail. The blade body 9 can preferably be produced as a forged part or milled out of a semi-finished material or a material plate. The blade body 9 comprises recesses 10, which serve the purpose of reducing the weight of the shear blade 2. The shear blade 2 additionally has an assembly region 18 by means of that the shear blade 2 can be installed in the cutting tool 1. The assembly region 18 comprises an opening 11, which serves the purpose of receiving a rotational axis component not shown in FIG. 5, e.g. a central pin, in order to fasten the shear blade 2 at the shared axis of rotation 6. The assembly region 18 additionally comprises an opening 12, which can receive an actuating element, not shown in FIG. 5, on the drive side, e.g. a securing pin, by means of which the shear blade 2 is fastened to a lever arm of a tool arm, in order to control the shear blade 2.

The shear blade 2 comprises a preferably concave cutting region 15 for cutting and severing of the material to be cut. The material to be cut is thereby cut by a cutting edge 16 and is pressed apart along an outside surface 14 of the blade body 9. According to the invention, the outside surface 14 comprises a first surface section 17a, which extends away from the cutting edge 16. The end of the first surface section 17a is attached to a second surface section 17b which is attached to a third surface section 17c.

The shear blade 2 of this invention preferably has a cutting insert 21 in the middle and back parts of the cutting region 15. The cutting insert 21 is attached to the blade body 9 of the shear blades 2 via fastening elements 23. Screws, pins or the like can be used as fastening component 23. The cutting insert 21 is inserted in the area of the cutting region 15 which is exposed to the highest stresses when it is engaged in cutting and is thus the first to wear out. This makes it possible for the cutting insert 21 to be replaced and the functionality of the shear blade 2 can be restored in the event that this region wears out, without the entire shear blade 2 having to be replaced. The cutting insert 21 can additionally be made of a harder and/or more resistant material than the basic material of the shear blade 2 in order to reduce the risk of wearing and improve the cutting power. The cutting effectiveness and the durability of the entire shear blade 2 can thus be improved, with the cost and weight remaining almost the same. The cutting insert 21 can additionally also include the surface sections 17a, 17b, 17c.

Figure 6B:
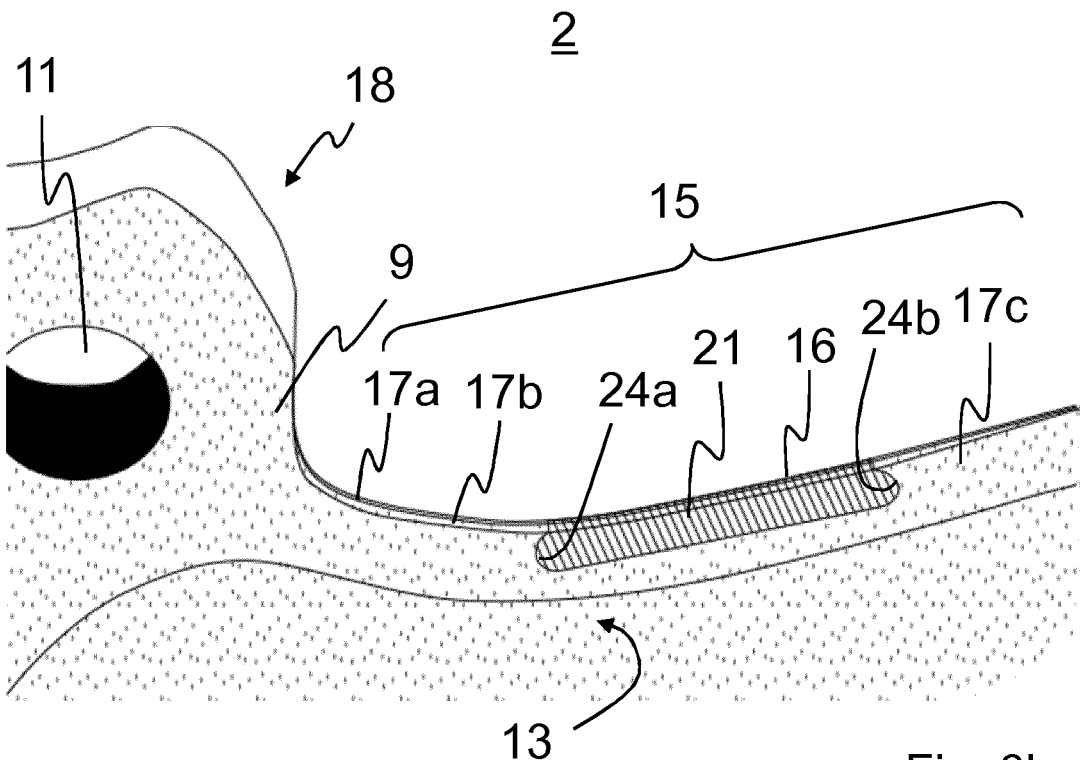

The shear blade 2 expediently also has a recess 22 shown in FIG. 6a in the area of the cutting region 15, which recess 22 serves the purpose of receiving the cutting insert 21. The recess 22 has front side undercuts 24a, 24b, which are designed to hold the cutting insert 21 in position and/or to guide it when it is being inserted. The cutting insert 21 as well as the recess 22 are, as shown in FIG. 6b, designed so that a form closure between cutting insert 21 and the recess 22 is formed as soon as the cutting insert 21 is fully engaged and/or slid into the recess 22. The form closure serves the purpose of acting upon the overwhelming portion of the shear stresses arising during the cutting process with compressive stresses on the structural components of the shear blade 2.

FIG. 7 shows a simplified section through the shear blade 2 in the center of the cutting region 15. The reference number 13 refers to a contact surface lying opposite the outside surface 14. When the pair of shear blades of a cutting tool 1 are opened and closed, the shear blades 2 are led past one another along their contact surfaces 13. As shown in FIG. 7, the cutting insert 21 is advantageously inserted at a preferably pointed angle δ with respect to the contact surface 13. The insertion direction ER of the cutting insert 21 is shown by a black arrow in FIG. 7. The cutting insert 21 thus constitutes a part of the outside surface 14 and, just like the outside surface 14 as well, accordingly comprises three surface sections 17a, 17b, 17c. After the cutting insert 21 is inserted, the cutting insert 21 is fastened to the blade body 9 by means of fastening components 23. The orientation of the fastening component 23 here runs at an acute angle c with respect to the contact surface 13 and/or essentially vertically to the insertion direction ER. The fastening is here conceived geometrically in such a way that it holds the cutting insert 21 in position in the recess 22, but so that the cutting insert bears as little as possible of the stress, such as e.g. stress peaks or high shear stresses, while most of the stresses, e.g. in the form of compressive stress, impinge on the blade body 9 by way of the form-fit between the cutting insert 21 and the recess 22.

FIG. 3 shows another simplified section through the shear blade 2 in the cutting region 15 next to the cutting insert 21. The first surface section 17a extends out from the cutting edge 16 at a low angle α with respect to the orthogonal O. The orthogonal O is here vertical to the contact surface 13 and meets the latter in the region of the cutting edge 16. The angle α is preferably 0.5°, 1.0°, 1.5°, 2.0° or 2.5°. The second surface section 17b following the first surface section 17a extends at an acute angle β with respect to the orthogonal O. The angle β is preferably in the range of 15° to 35°, preferably 20° to 25°. The third surface section 17c, which is oriented at an acute angle γ with respect to the orthogonal O, follows the second surface section 17b. The angle γ is preferably 40°, 45° or 50°. The angle α is accordingly smaller than the angle β and the angle β is smaller than the angle γ. The angle γ is at most 80°, preferably 70°, particularly preferably 60°.

The width of the first surface section 17a is preferably in the range of 0.5 to 1.5 mm; the width of the first surface section 17a particularly preferably lies in the range of 0.5 mm to 0.7 mm. As seen in the cross section of the shear blade 2, the width of the first surface section 17a is smaller than the width of the second surface section 17b and the width of the second surface section 17b is smaller than the width of the third surface section 17c.

FIG. 2, in which the cutting insert 21 of this invention is not shown for the sake of clarity, shows a further embodiment of the shear blade 2. The shear blade 2 in FIG. 2 also has a surface profiling in the cutting region 15, which profiling can at least partly extend over the cutting insert 21 of this invention. The surface profiling 19 can for example consist of grooves 20 that run next to each other as shown in FIG. 4a. The grooves 20 respectively comprise two opposite groove walls 20a, 20b and have a trapezoidal shape, with the respective trapezoids forming plateaus 20c on the top surfaces, which limit the surface profiling 19 toward the outside, i.e. in the direction of the material to be cut. By introducing such grooves 20, the cutting force acting on the material to be cut is converted into a higher cutting pressure. The material to be cut is thereby exposed to a greater stress and it breaks down earlier. A pressure saving of about 3-8% is achieved by providing the outer surface 14 with such grooves 20. It is thus possible to increase the cutting performance while the applied force and the weight stay the same.

The surface profiling 19 is expediently only located in the region of the second and third surface sections 17b, 17c, preferably extending over the entire width of the respective surface section 17b and/or 17c. This configuration has the benefit that, at the start of the cutting process, the material to be cut is pulled along the cutting edge 16 toward the axis of rotation 6, so that most of the cutting pressure is applied to the material to be cut at the back part of the cutting region 15. No surface shaping 19 is provided in the region of the first surface section 17a. The drawing in of the material to be cut toward cutting tool 1 is furthermore favored by the fact that the cutting edge 16 is concavely curved.

A special configuration of the surface profiling 19 and/or the grooves 20 in accordance with FIG. 4b can be used to further improve the effect of drawing in the material to be cut, i.e. to make it possible to also draw in the material to be cut during the start of the cutting process. These grooves 20 have a groove wall 20a, which is steep and curved, and a groove wall 20b, which is flat. Such grooves 20 can for example be milled in with a prism cutter, which is applied to the material at an angle. Depending on the selected distance between the milled-in grooves 20, there are plateaus 20c between the grooves 20, which limit the surface profiling 19 on the side facing the material to be cut.

The individual combinations (subsidiary combinations) as well as possible combinations of individual features of different embodiments not shown in the drawings are explicitly included in the disclosure.

LIST OF REFERENCE SYMBOLS

1 Cutting tool
2 Shear blade
3 Housing
4 Hydraulic cylinder
5 Control valve
6 Axis of rotation
7 Carrying strap
8 Handle
9 Blade body
9a Blade tip
10 Recess
11 Opening
12 Opening
13 Contact surface
14 Outside surface
15 Cutting region
16 Cutting edge
17a First surface section
17b Second surface section
17c Third surface section
18 Assembly region
19 Surface profiling
20 Groove
20a Groove wall
20b Groove wall
20c Plateau
21 Cutting insert
22 Recess
23 Fastening element
24a Undercut
24b Undercut
O Orthogonal
IT Insertion direction
α Angle
β Angle
γ Angle
δ Angle
ε Angle

The invention claimed is:

1. A shear blade for a portable hydraulic cutting tool comprising:
a blade body having an assembly region and a cutting region;
a cutting edge in the cutting region;
a contact surface for an additional shear blade located on one side of the cutting edge and an outside surface located on another side of the cutting edge, the outside surface acting on a material to be cut;
the cutting region having a recess for receiving a cutting insert;
wherein the recess is configured so that the cutting insert is insertable into the recess at a first acute angle with respect to the contact surface of the shear blade;
wherein a first surface section of the outside surface extends from the cutting edge in a direction orthogonal to the contact surface or at a second acute angle α with respect to the direction orthogonal to the contact surface;
a second surface section joins one end of the first surface section and is oriented at a third acute angle β with respect to the direction orthogonal to the contact surface;
a third surface section joins one end of the second surface section and is oriented at a fourth angle γ with respect to the direction orthogonal to the contact surface;
the second angle α being smaller than the third angle β and the third angle β being smaller than the fourth angle γ.

2. The shear blade according to claim 1, wherein, in a cross section of the shear blade, a width of the first surface section is smaller than a width of the second surface section, and the width of the second surface section is smaller than a width of the third surface section.

3. The shear blade according to claim 1, wherein the second angle α lies in the range of 0.5° to 5°.

4. The shear blade according to claim 1, wherein the fourth angle γ is greater than 45°.

5. The shear blade according to claim 1, further comprising a surface profiling only provided in the second surface section and/or the third surface section.

6. The shear blade according to claim 5, wherein the surface profiling extends over an entire width of the second surface section and the third surface section.

7. A shear blade for a portable hydraulic cutting tool comprising:
a blade body having an assembly region and a cutting region,
a cutting edge in the cutting region,
a contact surface for an additional shear blade located on one side of the cutting edge and an outside surface located on another side of the cutting edge, the outside surface acting on a material to be cut,
the cutting region having a recess for receiving a cutting insert, wherein the recess is configured so that the cutting insert is insertable into the recess at an acute angle with respect to the contact surface of the shear blade; and wherein a surface profiling is provided in the outside surface.

8. The shear blade according to claim 7, wherein at least one fastening element is included, the fastening element being oriented toward the cutting edge at a slanted angle with respect to the contact surface.

9. The shear blade according to claim 7, comprising an undercut on at least one side of the recess.

10. The shear blade according to claim 7, wherein the surface profiling includes individual grooves located next to one another.

11. The shear blade according to claim 10, wherein the grooves respectively have two opposite groove walls, with one of the groove walls being steep and curved, and the other of the groove walls being flat, with the steep groove wall located on the side of the respective groove, which faces a tip of the shear blade.

12. The shear blade according to claim 10, wherein the grooves are U-shaped, V-shaped or trapezoidal.

13. The shear blade according to claim 7, wherein the cutting edge is concavely curved.

14. The shear blade according to claim 7, further comprising a first opening for receiving a rotational axis component shared by the shear blade and the additional shear blade and a second opening for connecting an actuating element on a drive side are in the assembly region.

15. A portable hydraulic cutting tool for portable application, comprising:
 a housing,
 a hydraulic cylinder,
 a manually operated hydraulic control valve,
 two tool halves associated with an axis of rotation, which respectively include the shear blade according to claim 7.

* * * * *